Figure 1:
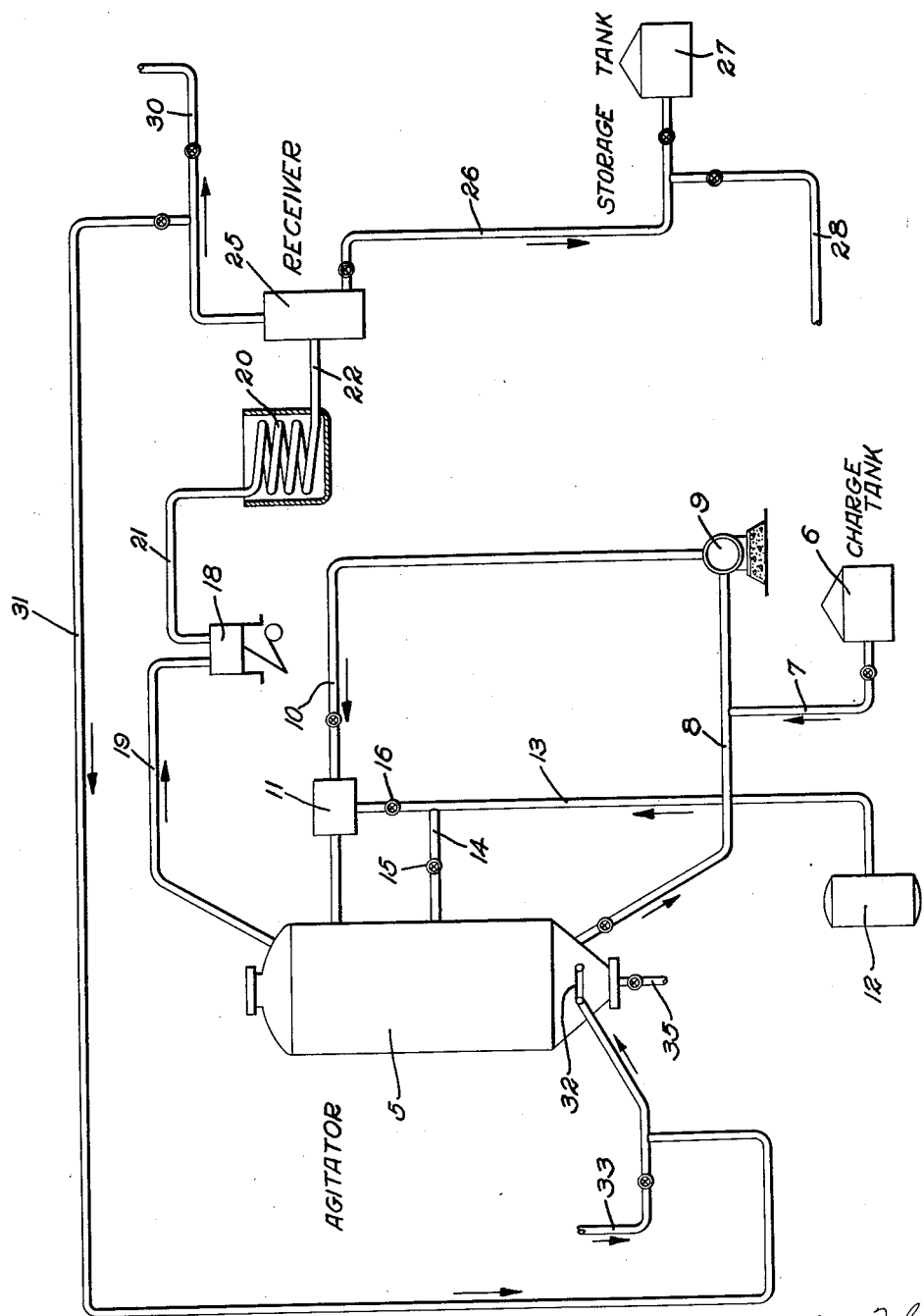

April 24, 1934.    L. DE FLOREZ    1,956,525
METHOD OF PURIFYING HYDROCARBON OIL
Filed March 30, 1931    2 Sheets-Sheet 1

Fig. I.

Luis de Florez
INVENTOR

BY R. J. Dearborn
ATTORNEY

April 24, 1934.   L. DE FLOREZ   1,956,525
METHOD OF PURIFYING HYDROCARBON OIL
Filed March 30, 1931   2 Sheets-Sheet 2

Luis de Florez
INVENTOR
BY R. J. Dearborn
ATTORNEY

Patented Apr. 24, 1934

1,956,525

UNITED STATES PATENT OFFICE 1,956,525

METHOD OF PURIFYING HYDROCARBON OIL

Luis de Florez, Pomfret, Conn.

Application March 30, 1931, Serial No. 526,274

7 Claims. (Cl. 196—40)

This invention relates to the treatment of hydrocarbon oils and has to do particularly with the refining of hydrocarbon oils with acid or polymerizing treating agents, such as sulfuric acid to purify the oil and in general to put the oil in a more satisfactory condition for market.

The invention is directed broadly to the treatment of petroleum hydrocarbons with a desired treating agent while maintaining the oil under vacuum, whereby vaporization of the oil may occur, and as a result of this vaporization the body of oil undergoing treatment may be lowered or maintained at a suitable temperature by the withdrawal therefrom of heat of vaporization required to convert the vaporized constituents from the liquid into vapor form.

The customary methods of refining oils is to thoroughly mix the oil either continuously or in batch, under atmospheric pressure or even superatmospheric pressure, with the treating agent and after the desired amount of reaction has occurred, the treating agent and sludge are withdrawn and the oil neutralized and washed. The temperature at which the oil is treated is determined largely by atmospheric conditions and by the amount of heat generated during the treating reaction. Ordinarily no control of the temperature is made; therefore, in the winter time, the temperature may be low while in the summer it may be relatively high. Furthermore the heat of reaction between the oil and treating agent is absorbed by the surrounding oil.

Experiments have shown that the treating temperature, especially in the case of acid treatments, is an important factor in influencing the quality of the finished oil. A high temperature has been found to cause the treating agent to react unduly with the oil causing high losses in polymers and sludge, in fact with many oils there is an optimum treating temperature and a few degrees variations therefrom may cause damaging effects to the finished product. Thus, it is important to remove the heat when and where it is formed.

Heretofore, it has been proposed to refrigerate or cool the oil by a refrigerating medium prior to acid treatment but such a method has certain disadvantages. The refrigeration cost for cooling large volumes of oil and treating agents is usually large. Also, the mechanical difficulties of cooling the oil particularly in the case of batch treatment, are great and the difficulty is increased because the heat which is often generated as a result of the reaction between oil and treating agent, causes local overheating that may be quite as detrimental as a general rise in temperature.

The present invention contemplates the prevention of local overheating or a general rise in temperature by removing heat from the oil in situ, by which I mean at the point where it is generated and simultaneously therewith. This removal of heat is done in a novel manner by creating conditions suitable for vaporization which will absorb heat sufficient to convert the oil from the liquid to vapor form or, in other words, the latent heat of vaporization. By reducing the pressure enough, I am able to cause vaporization of certain portions of the oil so that a general cooling of the oil occurs, or local cooling of the area where overheating is liable to take place.

A feature of the invention is the fact that the vaporization reduces the action of the treating agent on those portions vaporized. As applied to cracked gasolines this is a particular advantage in that the oil vaporized during the treating process is sufficiently treated before vaporization or is of such a nature as to require no acid treatment. The latter is particularly true of certain gasolines. For instance, 10 to 30% of the lower boiling constituents of cracked gasoline has been found to require no acid treatment to produce a finished product. The removal of the lower boiling fractions from the body of oil will not only reduce the treating loss but also the remaining unvaporized oil may be more effectively cooled. Furthermore, a reduction in total acid required for the treatment may be effected since its action is limited to the portion of the distillate which paricularly requires treatment.

The invention is adapted for the treatment of any oils including petroleum oils or mixtures of oils wherein light constituents may have been added if desired for the refrigerating effect or for reasons such as the dilution of viscous wax distillates prior to treatment. For example, an oil of relatively broad boiling range may be simultaneously treated and distilled to form the desired fractions or the oil may be treated with relatively little vaporization and then distilled or further processed as desired. It will be observed therefore, that the process of the invention is flexible and may be applied to many types of oils ranging from heavy lubricants to the lighter grades of gasolines, animal or vegetable oils the vacuum required varying with the boiling point of the oil and the degree of cooling desired.

While sulfuric acid has been mentioned as the treating agent, it is to be understood that the invention is applicable to other treating agents which may cause an exothermic reaction with the oil or otherwise require cooling of the oil or removal of generated heat, such as hydrochloric acid for instance.

The scope and advantages of the invention may be further understood from the description of the drawings which illustrate certain embodiments thereof. In the drawings, Figure 1 illustrates an apparatus for carrying out a batch operation according to the invention while Figure 2 shows an apparatus suitable for continuous operation.

Figure 2:
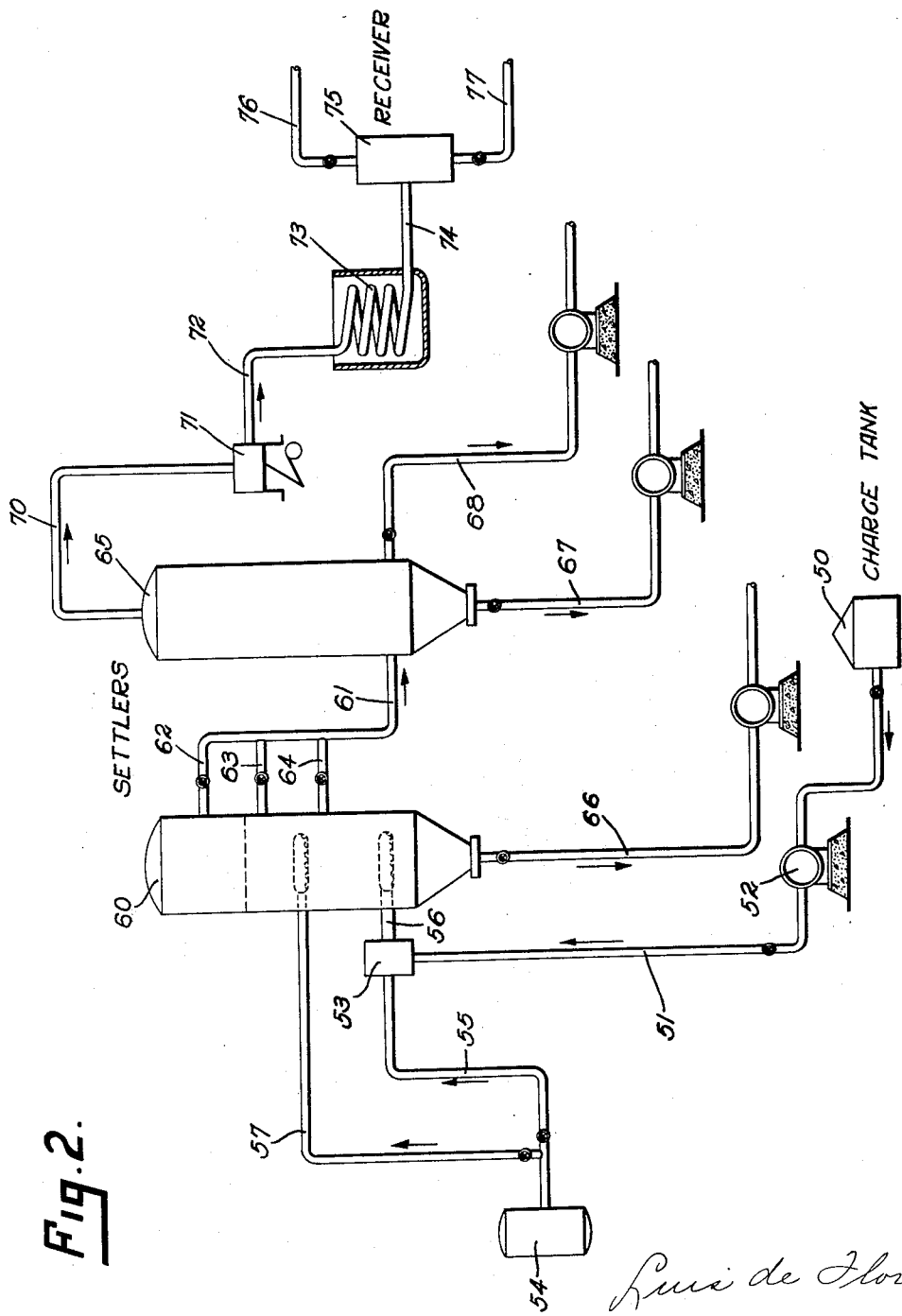

Referring to Figure 1, the reference character 5 represents an agitator for holding a batch of oil which may be contained in a tank 6. A line 7 connects the tank 6 with a pipe 8 extending from the bottom of the agitator. A pump 9 in the line 8 circulates the oil charged thereto through the line 10 to the top of the agitator if desired. A mixer 11 is located in the line 10 to permit mixing the treating agent with the oil. A tank 12, containing the acid or other treating agent, is connected to the mixer 11 by means of a line 13. A by-pass line 14 serves to conduct the acid from the line 13, in part or in whole, directly into the side of the agitator, if desired, by suitable regulation of the valves 15 and 16 in lines 14 and 13 respectively.

A vacuum pump or compressor 18 is connected on the suction side to the top of the agitator by means of a line 19 and on the discharge side to the condenser coil 20 by means of line 21. A pipe 22 extends from the condenser coil to a receiver 25. The liquid run-down line 26 serves to conduct the condensate from receiver 25 to a storage tank 27. A line 28 may be used if desired to recirculate the distillate back to the charging line 7 or to charging tank 6.

The gas line 30 communicates with the top of the receiver 25 to convey gases to storage or other means of disposal. A branch line 31 serves to conduct the gases, if desired, all or in part, to a spray 32 located in the bottom of the agitator where the gas acts to agitate the contents thereof. An airline 33 is also conneced to the spray 32 whereby air may be admitted to the agitator. A sludge line 35 is connected to the bottom of the agitator to draw off sludge settling down therein.

In practicing the invention with an apparatus such as that shown in Figure 1 the oil to be treated which may, for example, be cracked naphtha, is passed from the charge tank 6 through the line 7 to the line 8. The pump 9 then forces the oil from the line 8 through the pipe 10 and mixer 11 to the agitator. When sufficient oil has been charged to the agitator, the oil may be circulated from the bottom of the agitator back to the top of the agitator by the pump 9. Acid from the tank 12 may be passed through the line 13 to the mixer 11 wherein the oil and acid are commingled just before introducing the mixture into the top of the agitator. When the desired quantity of acid has been added, the mixture of oil and acid is circulated until the reaction is complete.

In one method of operation the agitator may be charged with oil as described heretofore and then the acid added directly to the agitator through the by-pass line 14. This may be done by proper regulation of valves 15 and 16 in the lines 14 and 13 respectively. Instead of circulating the oil and acid to obtain agitation, air or gas may be admitted through the line 33 and spray 32 to produce agitation and suitable contact between the acid and the oil.

In either method of operation a substantial vacuum is maintained on the agitator by the vacuum pump 18 whereby the vaporizing of the lower boiling components of the oil occurs as a result of the reduced pressure and likewise a corresponding cooling of the body of oil in the agitator takes place due to the withdrawal of heat equal to the latent heat of vaporizing of the vaporized constituents. The vapors are conducted to the condenser 20 where they are condensed and the condensate collected in receiver 25. Incondensable gases are discharged through the line 30 or by-passed back to the spray 32 in the bottom of the agitator.

Referring to Figure 2, the numeral 50 represents a charge tank for holding the oil to be treated. A line 51, in which is interposed a pump 52, connects the charge tank with a mixer 53. A tank 54 for containing acid or other treating agent is also connected to the mixer 53 by means of a pipe 55. The line 56 serves to conduct the mixture of oil and acid from the mixer to a settler 60. An alternate acid line 57 is provided for charging the acid direct to the agitator, if desired. A line 61, having branches 62, 63 and 64, communicating at different levels with the settler 60, connects the settler 60 with a second settler 65. Sludge lines 66 and 67 extend from the bottom of the settlers 60 and 65 respectively for withdrawing sludges therefrom. A pipe 68 serves to conduct the treated oil from the second settler 65 to a suitable neutralizing apparatus or for other treating equipment as desired.

A vapor line 70 connects the top of settler 65 to the suction side of a vacuum pump or compressor 71. A pipe 72 connects the discharge side of the vacuum pump with a condenser coil 73 and a pipe 74, in turn, connects the condenser coil with a receiver 75 which is equipped with the usual gas release line 76 and a liquid draw-off line 77.

The operation of the continuous treating system as shown in Figure 2, is as follows: Raw oil is continuously pumped from the charge tank 50 to the mixer 53 where it is intimately commingled with the desired amount of acid. The mixture is then passed through the line 56 to the settler 60 wherein a partial separation of oil and sludge occurs. The sludge collects in the bottom of the settler where it may be continuously or intermittently withdrawn through the line 66 while the acid oil rises in the settler and is drawn from the side thereof through either or both of the branch lines 63 and 64. The gas pressure between the top of the agitator and the line 61 may be conveniently equalized through the branch line 62 so that the acid oil may freely flow through the line 61 to the second settler 65. A small amount of sludge settles out in settler 65 and may be withdrawn through the pipe 67. The acid oil is continuously drawn through the line 68 and may be subjected to a neutralizing treatment or other treatment as desired.

A vacuum is maintained on the settlers 60 and 65 by a compressor or vacuum pump 71 to cause sufficient vaporization within the agitator to maintain the temperature of the oil therein low enough to prevent undue or excessive reaction between the acid and the oil. A light distillate may be collected in receiver 75 which is of good quality and may be recombined with the finished acid treated distillate to produce a marketable product.

Obviously many modifications may be made without departing from the spirit of the invention and therefore only such limitations are to be imposed on the scope thereof as indicated in the appended claims.

I claim:

1. The method of treating hydrocarbon oils which comprises mixing a polymerizing acid treating agent with the oil while cooling the oil in situ by maintaining sufficient vacuum on said oil undergoing treatment to effect substantial vaporization thereof without the addition of extraneous heat.

2. The method of purifying hydrocarbon oils which comprises subjecting the oil to an acid treating operation, maintaining the oil under vacuum whereby vaporization of lower boiling constituents thereof is effected without the addition of extraneous heat and effecting cooling of the oil during the treating operation by abstracting therefrom in situ the latent heat of vaporization of the vaporized low boiling constituents.

3. The method of treating hydrocarbon oils with an acid treating agent which produces an exothermic reaction with the oil comprising subjecting the oil to the action of the treating agent to effect a chemical reaction liberating heat, maintaining a vacuum on the oil during treatment whereby the heat of the reaction is immediately consumed at the point of generation by vaporizing the lower boiling constituents of the oil without the addition of extraneous heat, removing the generated vapors and affecting sufficient vaporization of the oil to prevent a rise in temperature of the oil during said treatment.

4. The method of controlling the temperature of oil during acid treatment which comprises applying a vacuum to the oil during said treatment to effect vaporization of a portion thereof without the addition of extraneous heat and to cool the unvaporized oil by withdrawing therefrom in situ the latent heat of vaporization of the vaporized constituents and regulating the vacuum to maintain the temperature of the unvaporized oil at a predetermined point.

5. The method of treating hydrocarbon oils comprising subjecting the oil to a treating operation with a polymerizing acid treating agent, said treating agent being substantially non-volatile under the conditions of treatment, simultaneously subjecting the oil to partial distillation by applying sufficient vacuum to effect substantial vaporization thereof without the addition of extraneous heat, thereby forming a vaporized fraction and concentrating the treating reagent in the unvaporized residual fraction, and effecting cooling of the oil during the treating operation by abstracting in situ the latent heat of vaporization of the distilled portion from the unvaporized fraction.

6. In the acid treatment of cracked naphtha, the improvement which comprises vaporizing 10-30% of the lower boiling constituents of the naphtha during said treatment by distillation under vacuum without the addition of extraneous heat and simultaneously cooling the oil to prevent undue reactions which result in losses of valuable products, by abstracting in situ from the oil latent heat of vaporization of the distilled lower boiling constituents.

7. The method of treating naphtha which comprises subjecting the naphtha to be treated in the liquid state and without the addition of volatile hydrocarbons, to the action of an acid treating agent while maintaining the naphtha under vacuum whereby evaporation of the naphtha is effected without the addition of extraneous heat, and regulating the temperature of the naphtha during the treatment by the evaporation.

LUIS DE FLOREZ.